United States Patent
Chess et al.

(10) Patent No.: US 7,194,759 B1
(45) Date of Patent: Mar. 20, 2007

(54) USED TRUSTED CO-SERVERS TO ENHANCE SECURITY OF WEB INTERACTION

(75) Inventors: David M. Chess, Mohegan Lake, NY (US); Joan Dyer, New York, NY (US); Naomaru Itoi, Ann Arbor, MI (US); Jeff Kravitz, Yorktown Heights, NY (US); Elaine Rivette Palmer, Goldens Bridge, NY (US); Ronald Perez, Mount Kisco, NY (US); Sean William Smith, Hanover, NH (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 09/663,664

(22) Filed: Sep. 15, 2000

(51) Int. Cl.
*H04L 9/00* (2006.01)

(52) U.S. Cl. .......................... 726/2; 713/155; 713/156; 713/173; 705/1; 705/53; 709/227; 709/203

(58) Field of Classification Search ................ 713/201; 380/25, 49; 705/1; 709/228, 203
See application file for complete search history.

(56) References Cited

U.S. PATENT DOCUMENTS

| | | |
|---|---|---|
| 4,817,140 A | 3/1989 | Chandra et al. |
| 4,916,738 A | 4/1990 | Chandra et al. |
| 5,109,413 A | 4/1992 | Comerford et al. |
| 5,146,575 A | 9/1992 | Nolan, Jr. |
| 5,148,534 A | 9/1992 | Comerford |
| 5,473,692 A * | 12/1995 | Davis ........................ 705/59 |
| 5,557,518 A | 9/1996 | Rosen |

(Continued)

OTHER PUBLICATIONS

Wilhelml, U., et al. "Introducing Trusted Third Parties to the Mobile Agent Paradigm" Institute pour les Communications informatiques et leurs Applications, Ecole Polytechnique Fédérale de Lausanne, 1015 Lausanne, Switzerland, pp. 1-21.*

(Continued)

*Primary Examiner*—Nasser Moazzami
*Assistant Examiner*—Carl G. Colin
(74) *Attorney, Agent, or Firm*—Scully, Scott, Murphy & Preser, P.C.; Lisa M. Yamonaco

(57) ABSTRACT

A trusted co-server, and a method of using a trusted co-server, for a service provider. The co-server executes a program such that: for multiple parties $P_0$–$P_n$ (where $P_o$ is said co-server), each party $P_i$ may (optionally) provide input $I_i$, and then said co-server carries out N functions: $F_i$ ($i_o$ . . . $I_n$) describes what the co-server returns to party $P_i$. The preferred embodiment of the invention raises the trust level of the computation and data storage at the server. For instance, this invention may be witness to authenticity of certain data coming back to the client. This data can include assertions from the trusted co-server about the server content and configuration. The invention, also, can provide privacy of data going back to the server, by keeping it encrypted between the client and the co-server, and then re-encrypting it before inserting it into the server. With this invention, the user can trust the integrity of the computation occurring at the co-server—even if the server operator might be motivated to subvert it. The co-server also provides a trusted haven for computation relevant to third parties who may also have an interest in the client-server interaction.

42 Claims, 13 Drawing Sheets

U.S. PATENT DOCUMENTS

| | | | |
|---|---|---|---|
| 5,590,197 A | | 12/1996 | Chen et al. |
| 5,590,199 A | * | 12/1996 | Krajewski et al. .......... 713/159 |
| 5,629,980 A | | 5/1997 | Stefik et al. |
| 5,677,955 A | | 10/1997 | Doggett et al. |
| 5,696,827 A | | 12/1997 | Brands |
| 5,742,756 A | | 4/1998 | Dillaway et al. |
| 5,768,382 A | | 6/1998 | Schneier et al. |
| 5,768,389 A | | 6/1998 | Ishii |
| 5,796,840 A | * | 8/1998 | Davis .......................... 705/51 |
| 5,835,595 A | | 11/1998 | Fraser et al. |
| 5,848,161 A | * | 12/1998 | Luneau et al. ................. 705/78 |
| 5,850,442 A | | 12/1998 | Muftic |
| 5,864,620 A | * | 1/1999 | Pettitt .......................... 705/54 |
| 5,903,882 A | | 5/1999 | Asay et al. |
| 5,917,912 A | | 6/1999 | Ginter et al. |
| 5,933,498 A | | 8/1999 | Schneck et al. |
| 5,943,424 A | | 8/1999 | Berger et al. |
| 5,956,699 A | | 9/1999 | Wong et al. |
| 6,385,723 B1 | * | 5/2002 | Richards ..................... 713/160 |
| 6,453,296 B1 | * | 9/2002 | Iwamura ........................ 705/1 |
| 6,643,701 B1 | * | 11/2003 | Aziz et al. ................... 709/227 |
| 6,714,982 B1 | * | 3/2004 | McDonough et al. ....... 709/228 |
| 6,748,528 B1 | * | 6/2004 | Greenfield .................. 713/151 |
| 2002/0111997 A1 | * | 8/2002 | Herlihy ...................... 709/203 |

OTHER PUBLICATIONS

Bruce Schneier, "Applied Cryptography", 1996; John Wiley & Sons; Second edition; pp. 566-571.*

"IBM 4758 Models 1 and 13 PCI Cryptographic Coprocessor", IBM Product Brochure G221-9091, (1999).

"IBM Coprocessor First to Earn Highest Security Validation", Press release, IBM Corporation, Dec. 1998.

Palmer, E., "An Introduction to Citade-A Secure Cryto Coprocessor for Workstations", Research Report, RC 18373, IBM T.J. Watson Research Center, 1992.

Weingart, S.H., "Physical Security for the ABYSS System", IEEE Security and Privacy, Oakland, 1987.

White, S.R., et al., "ABYSS: A Trusted Architecture for Software Protection", IEEE Security and Privacy, Oakland, 1987.

White, S.R., et al., "Introduction to the Citadel Architecture: Security in Physically Exposed Environments", Research Report RC 16672, IBM T.J. Watson Research Center, 1991.

Smith, S., et al., "Building a high-performance, programmable secure coprocesser," Reprinted from Computer Networks, The International Journal of Computer and Telecommunications Networking, Secure Systems and Smart Cards, IBM T.J. Watson Research Center, Computer Networks 31, (1999), pp. 831-860.

Smith, S., et al., "Practical Private Information Retrieval with Secure Coprocessors", IBM T.J. Watson Research Center May 23, 2000, pp. 1-11.

Wilhelm, U., et al., "Introducing Trusted Third Parties to the Mobile Agent Paradigm", Laboratoire de Systemes d'Exploitation, Institut pour les Communications Informatiques et leurs Applications Ecole Polytechnique Federale de Lausanne, 1015 Lausanne, Switzerland.

Wilhelm, U., et al., "Introducing Tusted Tird Parties to the Mobile Agent Paradigm", Institut pour les Communications informatiques et leurs Applications Ecole Polytechnique Federale de Lausanne, 1015 Lausanne, Switzerland.

Gobioff, H., et al., "Smart Cards in Hostile Environments", Proceedings of the Second USENIX Workshop on Electronic Commerce, Oakland, California, (Nov. 1996).

Havener, W., et al., "Derived Test Requirements for FIPS PUB 140-1, Security Requirements for Cryptographic Modules", http://csrc.nist.gov/cryptval/140-1/140test1.htr, (Mar. 1995).

Smith, S., "Secure Coprocessing Applications and Research Issues",Los Alamos National Laboratory, Los Alamos Unclassified Release LA-UR-96-2805, (Aug. 1, 1996).

Smith, S., "Validating a High-Performance, Programmable Secure Coprocessor", IBM T.J. Watson Research Center, Yorktown Heights, New York 10598-0704.

Yee, B., "Using Secure Coprocessors", School of Computer Science Carnegie Mellon University, Pittsburgh, PA 15213, (1994).

"Security Requirements For Cryptographic Modules", http://www.itl.nist.gov/fipspubs/fip140-1.htp, Federal Information Processing Standards Publication 140-1, (Jan. 1994).

Dyer, J., et al., "Application Support Architecture for a High-Performance, Programmable Secure Coprocessor", IBM T.J. Watson Research Center, Yorktown Heights, New York 10598-0704.

Smith, S., et al., "Trusting Trusted Hardware: Towards a Formal Model for Programmable Secure Coprocessors", Proceedings of the 3rd USENIX Workshop on Electronic Commerce, Boston, Mass., (Aug. 31-Sep. 3, 1998).

Smith, S., et al., "Using a High-Performance, Programmable Secure Coprocessor", IBM T.J. Watson Research Center, Yorktown Heights, New York 10598, pp. 73-89.

Smith, S., et al., "Practical Private Information Retrieval with Secure Coprocessors", IBM Research Report, RC 21806 (Log#98098), (Jul. 27, 2000).

* cited by examiner

USED TRUSTED CO-SERVERS TO ENHANCE SECURITY OF WEB INTERACTION

BACKGROUND OF THE INVENTION

This invention generally relates to transactions using the World Wide Web; and more specifically, the invention relates to improving the security of such transactions.

The World Wide Web is the grounds where, on a broad scale, our society's business, government, and personal services are migrating and growing. As a basic model, a large population of clients with browsers obtain services from a smaller population of service providers operating Web servers. However, for each critical service that takes root in the Web (and arguably for many purely recreational services as well), the financial and personal interests of the clients force them to trust the integrity and privacy of the computation and data storage at the service providers.

Distributed computation (and even centralized computation, with multiple parties) introduces a fundamental problem: distribution dissociates dependency from control. Consider a basic scenario outlined in FIG. 1. In this example, Alice and Bob participate in some computational activity. Alice's interests I depends on some correctness and/or privacy properties P of some computation X at a computer that Bob controls. Consequently, Alice must depend on Bob to preserve and protect her interests. However, Bob may have no motivation to do this; and, in fact, Bob's interests may conflict with Alice's, and motivate him to actively subvert Alice's computation.

In the above example, dependency on remote computation went one way. However, the scenario can be more complex, as FIG. 2 shows. In this example, suppose Alice and Bob are users in a decentralized e-cash system, where cash is a value in a register in a wallet, and is exchanged by a protocol between the wallets. The computations $X_A$, $X_B$ are the storage and appropriate alteration of the amount of money in Alice's wallet and Bob's wallet, respectively. The important security properties $P_A$, $P_B$ of these computations are that the values in these wallets only increase under appropriate circumstances. Alice's interests $I_A$ include maximizing the amount of money she has, and preserving its value; Bob's interests $I_B$ are symmetric.

If Alice can break into her wallet, she can break $P_A$; similarly, Bob can break $P_B$. Alice's interests $I_A$ depend on $P_B$ holding; but Bob's interests $I_B$ motivate him to break $P_B$. Symmetrically, Bob's interests depend on $P_A$, which Alice is motivated to break.

All parties in this distributed e-cash system must trust all other parties; in a sense, the least-trusted user has the ability and the motivation to subvert the entire system.

Previous research had long speculated that programmable, trusted secure coprocessors could enable systematic solutions to problems such as FIG. 1. FIG. 3 illustrates a revised scenario. If X occurred in a secure coprocessor at Bob's machine, and Alice was able to authenticate that X was occurring there, beyond Bob's control, and Bob's ability to manipulate his host and its network connections could not subvert P, then Alice can trust that the important properties $P_B$ still hold of X, despite Bob's potential attacks.

As the popularity of the Web—and the recognition of its potential for applications with real security issues—spread, many proposals and ideas surfaced to add security to the basic http protocol. At one point, three primary contenders emerged:

i) Shen from CERN,
ii) Secure HTTP from a consortium including NCSA, and
iii) Secure Socket Layer (SSL), from Netscape.

Primarily because Netscape's SSL protocol was the first to be widely deployed, SSL became the de facto standard for securing Web transactions.

As practiced, SSL permits the client to establish a shared symmetric key with a specific authenticated server. The server has a private-public keypair, and a certificate from some CA attesting to certain properties about the entity owning this public key. The client browser has some notion of which CA root keys it recognizes as valid. When a client opens an SSL connection, it verifies that the certificate from the server is correctly signed by a CA root that the client's browser currently recognizes as legitimate. The client and server then carry out a key generation/exchange protocol that ensures that the client, and a party which knows the private key matching the server's public key, share a symmetric key—that is (theoretically) shared by no one else, not even an adversary observing the messages between the client and server.

The remainder of the SSL session is then encrypted with this session key. Encryption with a key obtained this way provides several properties. Both parties can trust the privacy of data from the client to the server. Both parties can trust the privacy of data from the server back to the client. Both parties can trust that an adversary cannot alter or manipulate data in either direction without detection (since SSL provides integrity checking and sequence numbering). The client can trust the authenticity of the server (since the server entity must know the private key matching the public key in the certificate). The server can trust that, throughout the session, the entity claiming to be the client is the same entity that started the session. FIG. 4 shows a more detailed ladder diagram.

Even with the current state of deployed technology (i.e., SSL), however, all the client can know for sure is the identity of the entity who originally possessed the public key in that server's certificate.

At best, this identity establishes good intentions—if the alleged service provider has a pre-existing reputation that makes this hypothesis plausible. On the other hand, a service provider with an unknown reputation might be downright malicious. Also, any service provider may have good intentions, but may be careless with general site security. Moreover, the entity with which the client is currently interacting may not even be this original service provider, but rather an imposter who has learned the private key.

The threat that arises from this uncertainty is amplified by the Web's distribution of computation from server to client: via Java and Javascript, and also via more subtly executable content, such as Word documents infected with Macro viruses. Furthermore, many interactions involve more parties than just the client and server, but these additional parties are also forced to trust the server integrity.

This situation—that participants are forced to trust server integrity, but have no basis for this trust—is a fundamental problem threatening a wide variety of Web applications. Several of these applications are discussed below. These applications are shown herein to represent examples having missing security and/or privacy properties.

Authentication of Clients

The current Web infrastructure prevents a server from being able to prove anything to a third party about the identity of an alleged client. Without a public-key infrastructure for citizens, clients are forced to use human-usable authenticators, such as user ids and passwords. However, in the current infrastructure, these are exposed to the server of unknown integrity. As a consequence of this exposure, an adversary who compromises the server (or a malicious server operator) can impersonate this user at that site and any others where the client has used that password. This exposure also prevents legitimate server operators from being able to argue it really was a particular client who opened a particular a session. In this application, "user" and "client" are used interchangeably.

Nonrepudiation of Client Activity

The current Web infrastructure prevents a server from being able to prove anything to a third party about the activity of an alleged client. For example, how can an insurance company taking an application over the Web turn around and prove that a particular individual really answered that question that way?

Nonrepudiation of Server Activity

The current Web infrastructure prevents a server from being able to prove anything to a third party about the activity of the server—including the questions that generated the answers a client provided.

Credit Card Transaction Security

The current Web infrastructure provides secure transmission of a client's credit-card information and transaction amount to a server, where they are then exposed. An adversary who compromises this server (or a malicious server operator) can change the amount of the transaction, retain the amount but repeat the transaction many times, or use the credit card information to forge additional transactions. This situation may significantly reduce the potential market for new e-merchants without a pre-established reputation.

Taxes on E-Commerce Activity.

The current Web infrastructure provides no acceptable means for a third party with legitimate interests (such as a government's tax collection service) to accurately learn certain information about individual or collective Web interactions (such as how much sales tax an e-merchant owes them for last month). Reporting all transactions to the government would be unacceptable to the merchant and customer for privacy concerns; while reporting only a total amount owed would be unacceptable to the government, since the figure would be unverifiable, and the merchant reporting this unverifiable figure would be motivated to understate it.

Re-Selling of Intellectual Property

The current Web infrastructure provides no acceptable means for a third party who participates in an interaction indirectly, by licensing proprietary information to the server, to protect their legitimate interests. For example, a publisher who owns a large copyrighted image database might wish to make this available to a university library—but might worry that compromise of the university server will compromise the database.

Privacy of Sensitive or Proprietary Web Activity

The current Web infrastructure provides no means for a server operator to plausibly deny that they (or an adversary who has compromised their machine) is not monitoring all client interactions. How can companies that are accessing a competitor's server, know for sure that said competitor is not data-mining their queries? What about people who wish to purchase sensitive literature (about health topics, or currently unfashionable politics)? If an auction server provides a bulletin board service where customers can post "anonymous, confidential" comments, how do the customers know their identity is being kept secret? What about a server who is participating in an anonymous re-rerouting service?

Correctness of Web Activity

The current Web infrastructure provides no means for a server operator to establish that they (or an adversary who has compromised their machine) has not otherwise altered or corrupted important correctness properties of the service. In the auction bulletin board service described above, how can customers know that the anonymous posts came from bona fide customers, and that the timestamps are correct?

Enforcement of Logo/"Seal of Approval" Licenses

The current Web infrastructure provides no effective means for a party to ensure that logos or endorsements appear only on the appropriate server pages. For example, a company could establish an "inspected" logo to endorse servers who have withstood inspection by the ethical hackers of IBM Global Services. However, any client who visits these pages can capture the logo, and put it on any page.

Safety of Downloadable Content

The current Web infrastructure provides no means for the client to ensure that executable content downloaded from a server is indeed safe, short of the client themselves actually running the latest anti-virus software. Since most consumers do not do this, this leaves them at risk. Moving this computation (and the anti-virus update problem) to the server is more efficient—but how can clients know the server really carried this out?

Authenticity of Downloadable Content

The current web infrastructure provides no easy means for the client to authenticate the origin of downloadable content. Posters of content can provide digital signatures, but then the client needs to explicitly obtain and verify the trust chain on each item. Moving this computation (and the latest certificate revocation lists) to the server is more efficient—but how can clients know the server really carried this out?

Integrity of Server Machine

The current Web infrastructure provides no means for the client to recognize those servers whose hosts do run more secure operating systems or have more secure administrative practices. How can a consumer know for sure that a site really ran a particular network security analyzer or used a particular new secure boot system?

SUMMARY OF THE INVENTION

An object of this invention is to provide a way for parties in a Web interaction to have confidence in the server integrity.

Another object of the present invention is to add a secure coprocessor to an existing service provider infrastructure.

A further object of this invention is to provide a set of programs for a coprocessor for an existing service provider, that address the fundamental web security problem by raising the trust level of the computation and data storage at the server.

Another object is to provide these properties without substantial changes to the client infrastructure.

Another one: that a server operator can enhance his service to have these properties, by adding hardware and software to his own site (instead of, for example, moving computation to a literal third party somewhere else in the net).

These and other objects are attained with, and with a method of using, a trusted co-server for a service provider. The co-server executes a program such that:

for multiple parties $P_0$–$P_n$ (where $P_o$ is said co-server) each party $P_i$ may (optionally) provide input $I_i$, and then said co-server carries out N+1 functions: $F_i$ ($I_o \ldots I_n$) describes what the co-server returns to party $P_i$.

The preferred embodiment of the invention, as described below in detail, raises the trust level of the computation and data storage at the sever. For instance, this invention may be witness to authenticity of certain data coming back to the client. This data can include assertions from the trusted guardian about the server content and configuration. We use the term "guardian" to refer to the trusted co-server. The invention, also, can provide privacy of data going back to the server, by keeping it encrypted between the client and the guardian, and then re-encrypting it before inserting it into the server.

With this invention, the user can trust the integrity of the computation occurring at the guardian—even if the server operator might be motivated to subvert it. The guardian also provides a trusted haven for computation relevant to third parties who may also have an interest in the client-server interaction.

As used herein a co-server is another computer participating in the service. A co-server is trusted (referred to as a trusted co-server) when the client and/or server operator can trust that this co-server operates securely. A secure coprocessor is a computer with sufficient physical and logical security protections so that it can be trusted to carry out its computation despite attack by an adversary with direct physical access. The IBM 4758 (further discussed in "building a high-performance, programmable secure coprocessor," by Smith and Weingart, Computer Networks 31 (1999) 831–860) is an exemplary secure coprocessor; withstanding Level 4 validation against the FIPS 140-1 standard is an exemplary way of establishing that a coprocessor has sufficient physical and logical security protections.

Other methods may discuss using secure coprocessors as accelerators of SSL connections in the Web sites, but not using these as a trusted third party participating in the interaction in accordance with the present invention. For example, in the other methods the symmetric key guarding the client session is known by the server. Thus any communication sent back and forth is known by the server, thus forfeiting the security and privacy advantages provided by the present invention.

An aspect of the present invention is to provide an advantageous, (and most often relatively painless) way for clients to establish an authenticated and private channel to a trusted co-server. This is advantageously performed with minimal change to the current client infrastructure.

As example of a useful embodiment is when the service is a Web service, and a relatively "painless way" is SSL. Those familiar with the art will realize the many varying ways to use this trusted third party for various types of sessions and applications.

As used herein the term operator includes any of the many different types of operators. For example an "operator of service" may rent space on someone else's server. In this case, the "operator" may refer to said service operator, or said server operator.

The present invention is adaptable to a service and more particularly to a computational service. As used herein, a computational service is a service whose provision involves a computer. Examples include any information—and/or data—provider such as received and/or exchanged with a Web site, and especially an information/data-only Web site, and also a Web or other site through which a user purchases a physical object, etc.

One embodiment of the invention is a method for enhancing a service to provide security and privacy to each client of a plurality of clients. Said service includes computation. An exemplary service might be a Web site, with the clients being the remote users of this site accessing it via browsers. The invention moves a selected portion of the computation from a server into a trusted co-server executing to interact with the server through the co-server. In some embodiments the portion is the entire computation.

In another embodiment of this invention, the step of moving and enabling include providing a trusted third party at the server. That is, the client and/or server can trust the co-server to operate securely despite potential efforts by the client and/or server to compromise this security.

In another embodiment of this invention, the step of allowing includes enabling the client to have an authenticated, private channel to the co-server.

In another embodiment of this invention, the service is a Web service and the clients are remote users operating browsers.

In another embodiment of this invention, the step of enabling includes the client using the co-server's certified keypair to establish a shared symmetric key.

In another embodiment, the step of enabling includes using the Secure Sockets Layer (SSL) protocol.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
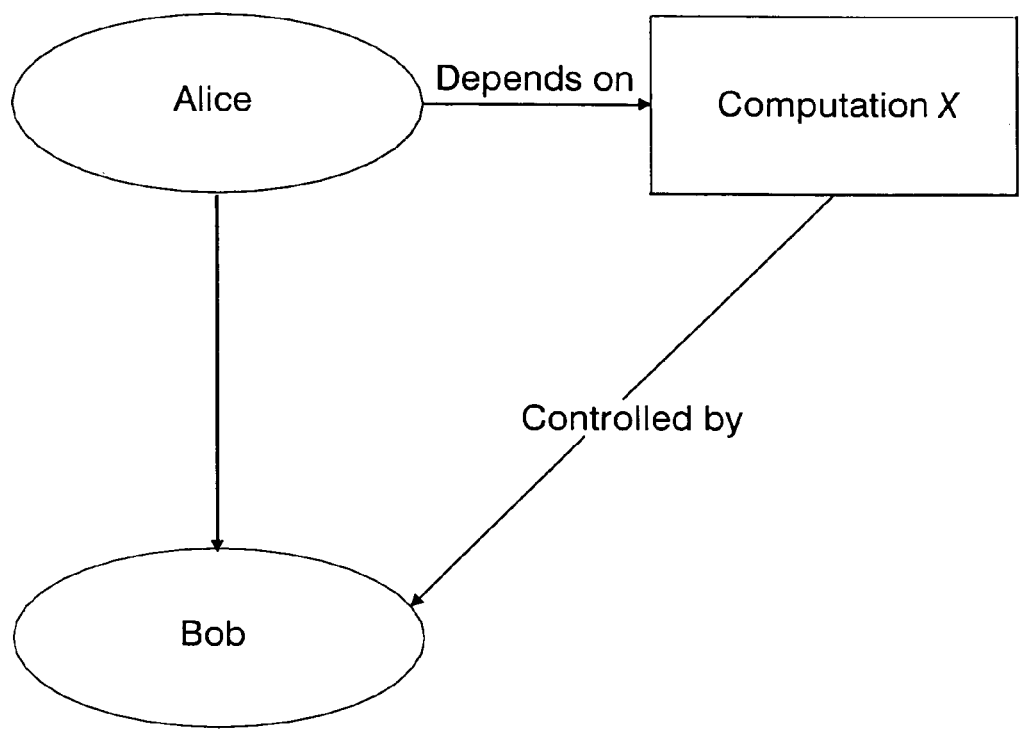
FIG. 1 illustrates a basic scenario in which a Web user depends on a server to protect the user's interests.
Figure 2:
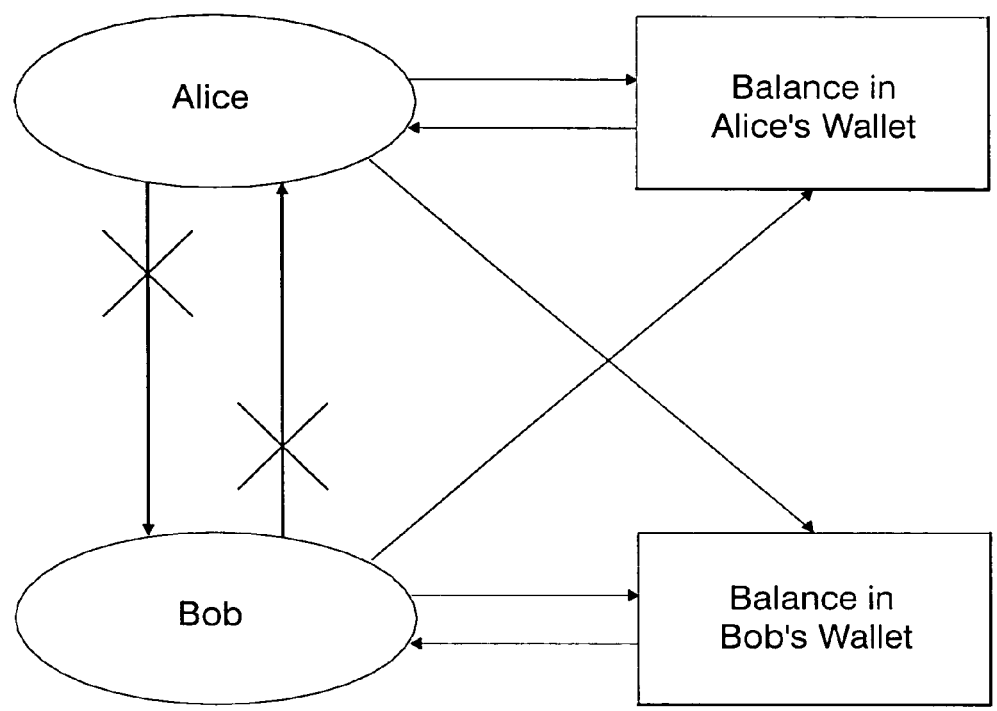
FIG. 2 depicts a mutual trust scenario in which people depend on each other to protect their respective interests.
Figure 3:
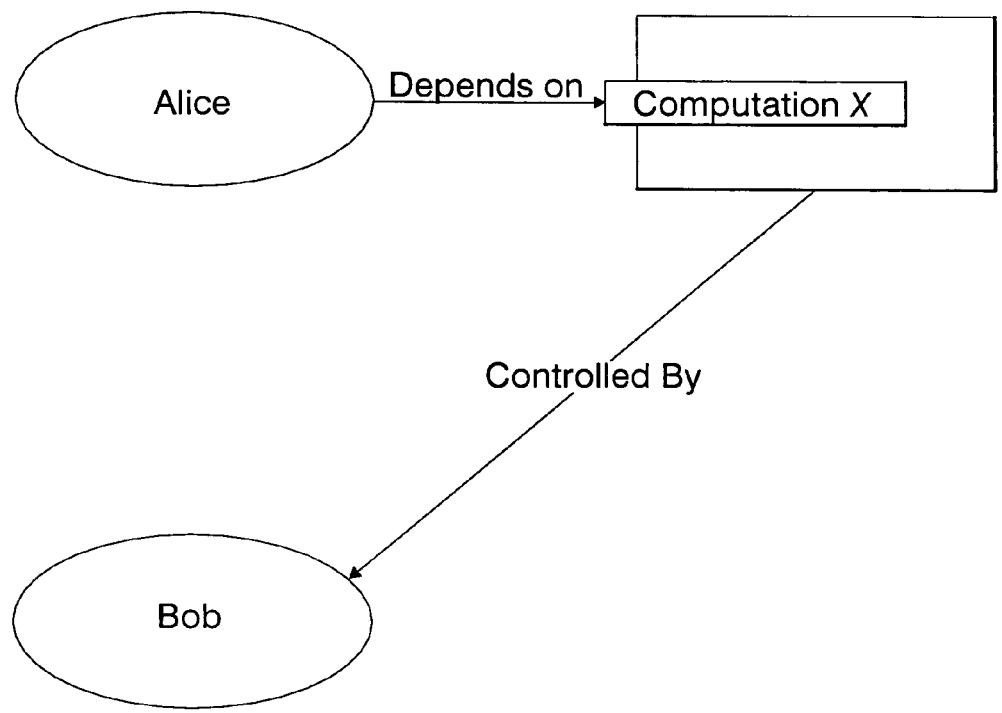
FIG. 3 shows a revision of the scenario of FIG. 1, in which a secure coprocessor is used to protect the interests of the user.
Figure 4:
FIG. 4 is a ladder diagram illustrating a Web security protocol referred to as Secure Socket Layer (SSL).
Figure 5:
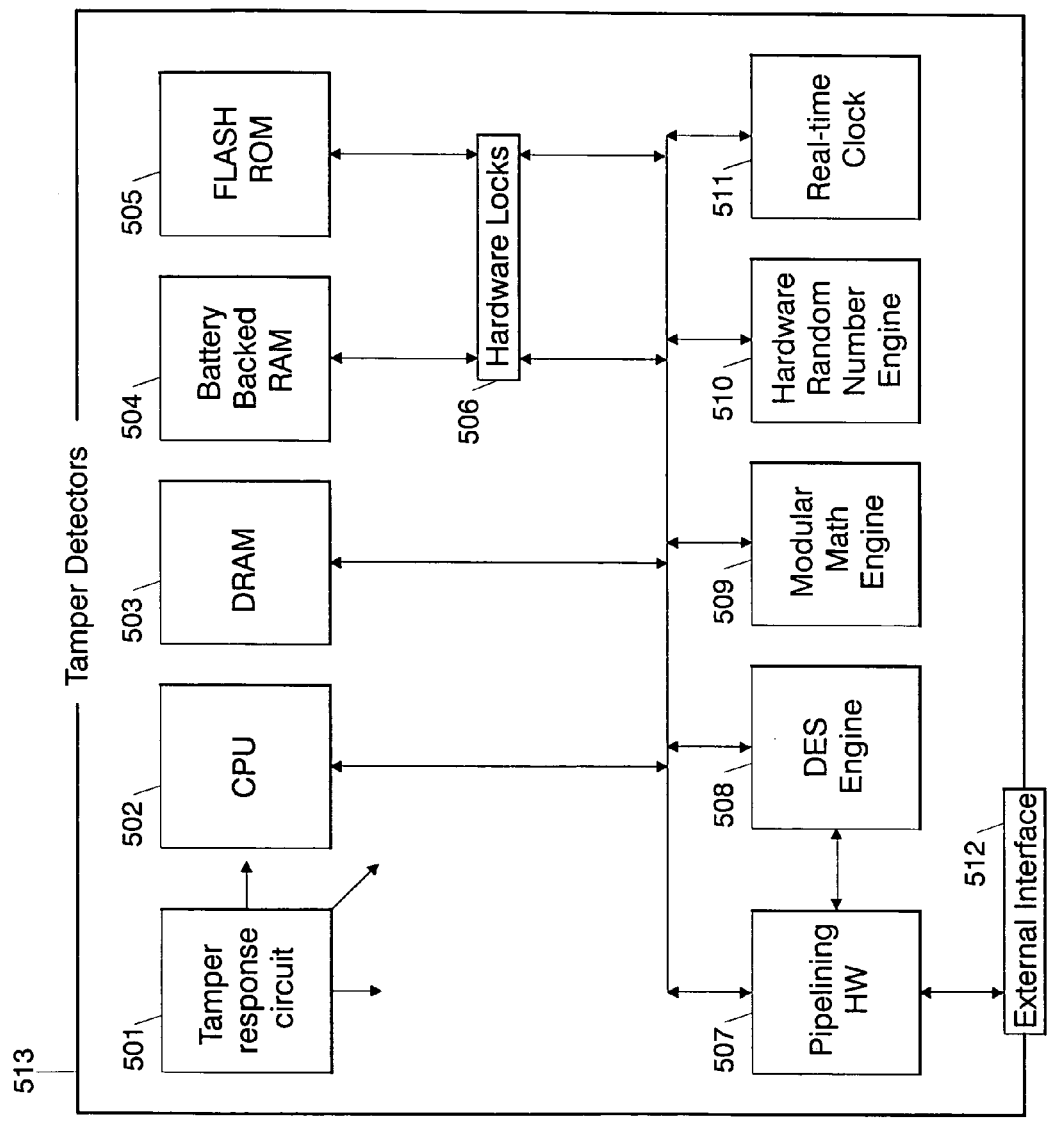
FIG. 5 shows the hardware of an exemplary secure coprocessor platform embodying this invention.

FIG. 5 shows the hardware of an exemplary secure coprocessor platform, based on the commercially available IBM 4758 Model 2. The device provides general-purpose computing environment for applications (502, 503, 504, 505), with hardware support for cryptographic applications (507, 508, 509, 510). However, the device also provides crucial security features, including i) Continuously active tamper-detection circuitry (501) monitors tamper detectors (513) and, in case of physical attack, destroys sensitive secrets in secure memory (503, 504) before an adversary can access them; and ii) Hardware locks (506) protect crucial code and secrets from possibly malicious or faulty application code, preserving the ability of each device to properly authenticate its configuration, and preventing a device with a rogue application from impersonating other devices and applications.

Figure 6:
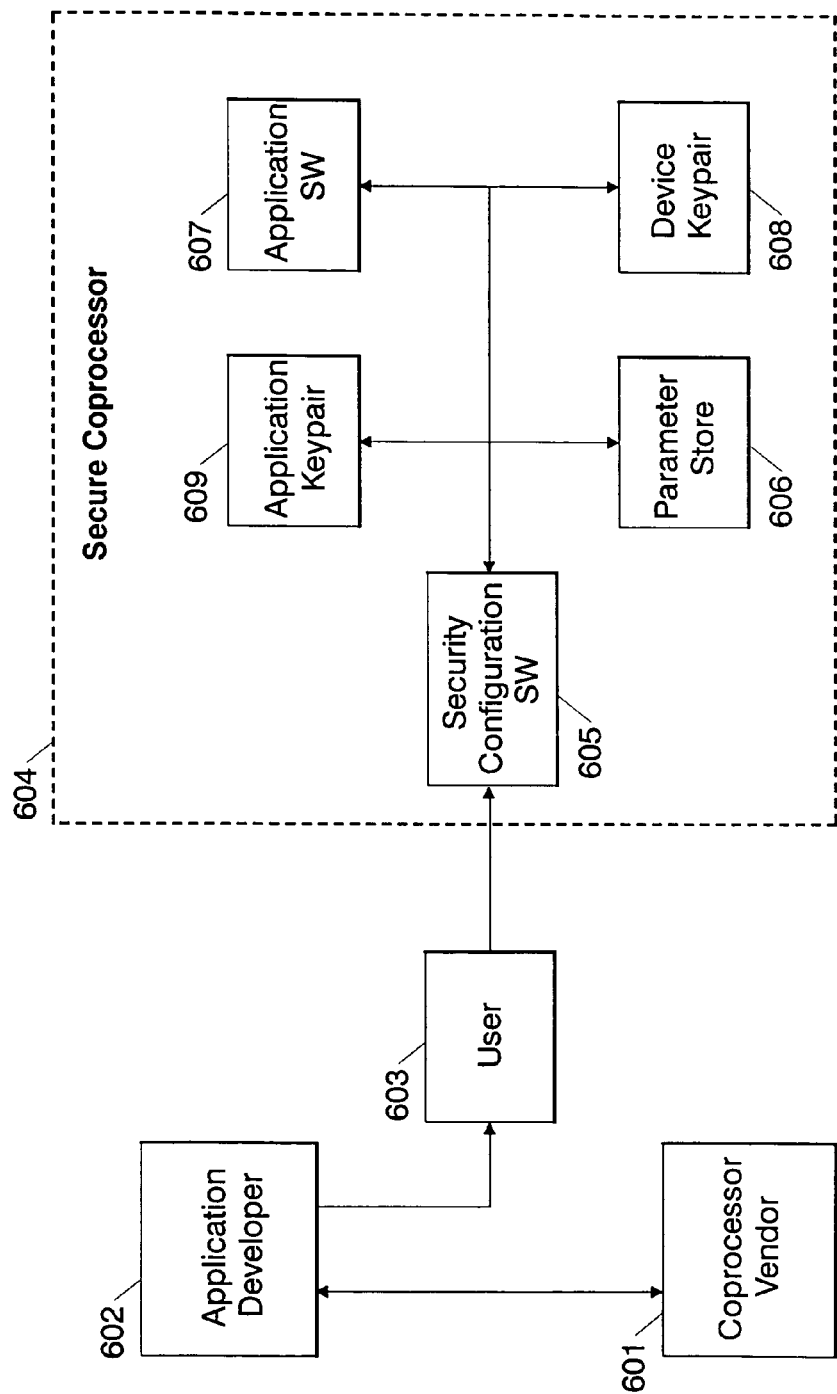
FIG. 6 shows the software configuration architecture for an exemplary coprocessor platform.

FIG. 6 shows the software configuration architecture for an exemplary secure coprocessor platform, based on the commercially available IBM 4758 Model 2. The coprocessor vendor (601) gives an application developer (602) a unique identifier, a signed command telling coprocessors with no application to recognize that developer as their application owner, and a signed command telling coprocessors that this application developer has a specified public key.

The application developer (602) then signs his application code with his private key, and gives this signed code, along with the vendor-provided commands, to the user (603). The user (603) provides these items to the security configuration software (605) within the secure coprocessor (604). This software validates the commands against the vendor's public key and other parameters in the parameters store (606). If things validate, the security configuration software takes these steps:

i) it updates the parameter store (606) to record that the application developer (602) now owns the application space within this device, and records the developer's idea and public key, ii) it installs the application as the device's application software (607), iii) it generates a keypair (609) for this application installation on this device; uses the devices's own keypair (608) to certify that this new keypair belongs to that application, for that owner, in that device; and leaves this application keypair (609) in a place where the application software (607) can access it at run-time.

We note that FIG. 6 shows an exemplary architecture only. Coprocessors with architectures that provide for a layer of system software below the application software (such as the current IBM 4758) can be configured to provide the important properties of FIG. 6.

Figure 7:
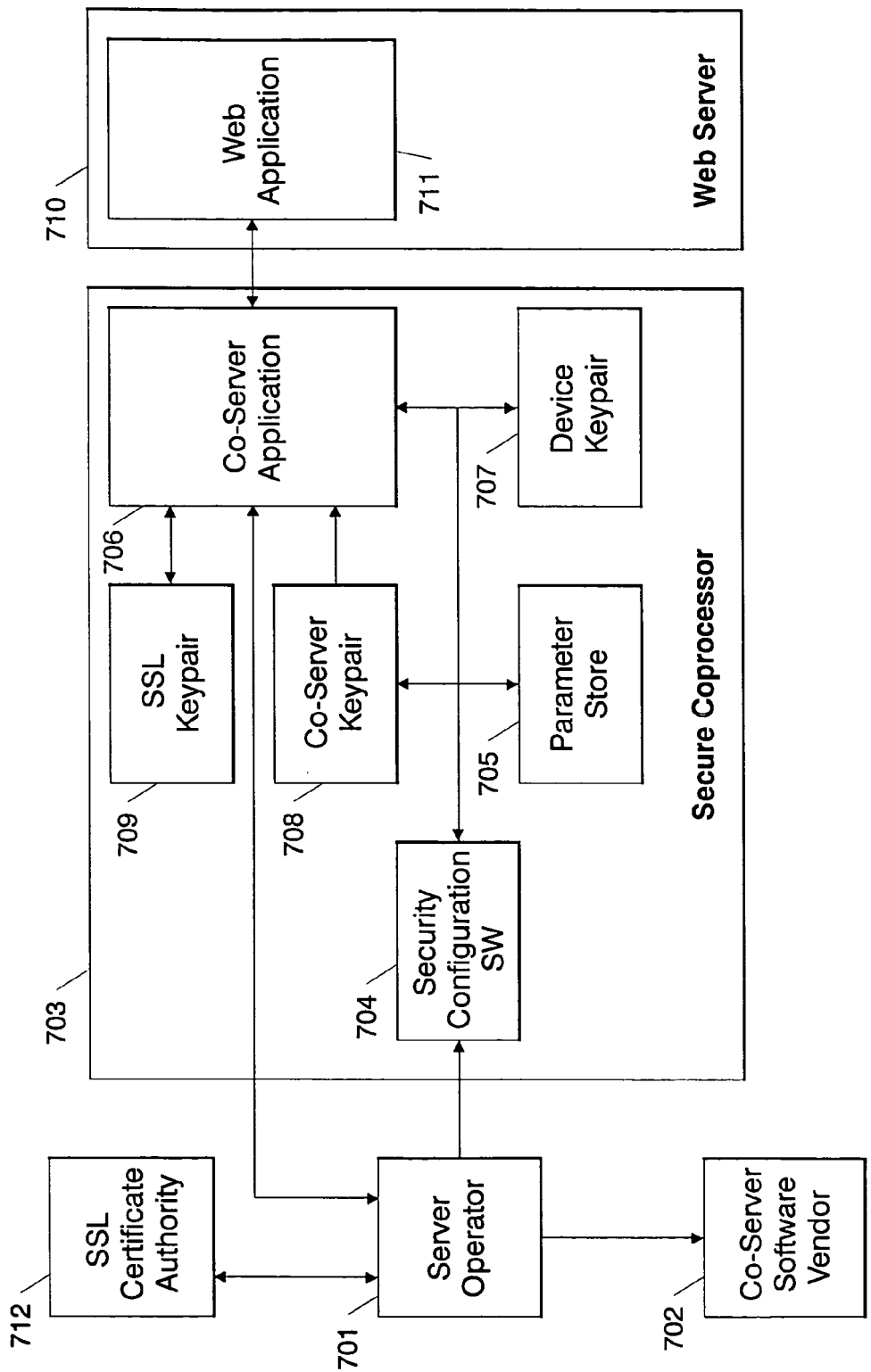
FIG. 7 shows an exemplary process for a server operator to use a secure coprocessor platform to install and certify a trusted co-server.

FIG. 7 shows an exemplary process for a server operator to use a secure coprocessor platform to install and certify a trusted co-server. The server operator (701) obtains a secure coprocessor platform (703), and uses the mechanisms of FIG. 6 (e.g., 704, 705, 707) to install co-server application software (706) from a co-server software vendor (702) into this device. The co-server application then generates another keypair (709). The server operator uses the co-server application's ability to authenticate itself with the co-server keypair (708), to prove to the satisfaction of a recognized SSL certificate authority (712) that said new keypair (709) belongs to an installation of said co-server application (706) securely running on an untampered secure coprocessor platform (703) at the site of said server operator (701).

The SSL Certificate Authority then issues an SSL-compatible certificate attesting to the public key of this keypair (709) and the entity (co-server application inside secure coprocessor at server operator) to which it belongs. The co-server application stores this certificate, and is then ready to participate as a trusted co-server to server operator's web application (711) on his web server (710).

Figure 8:
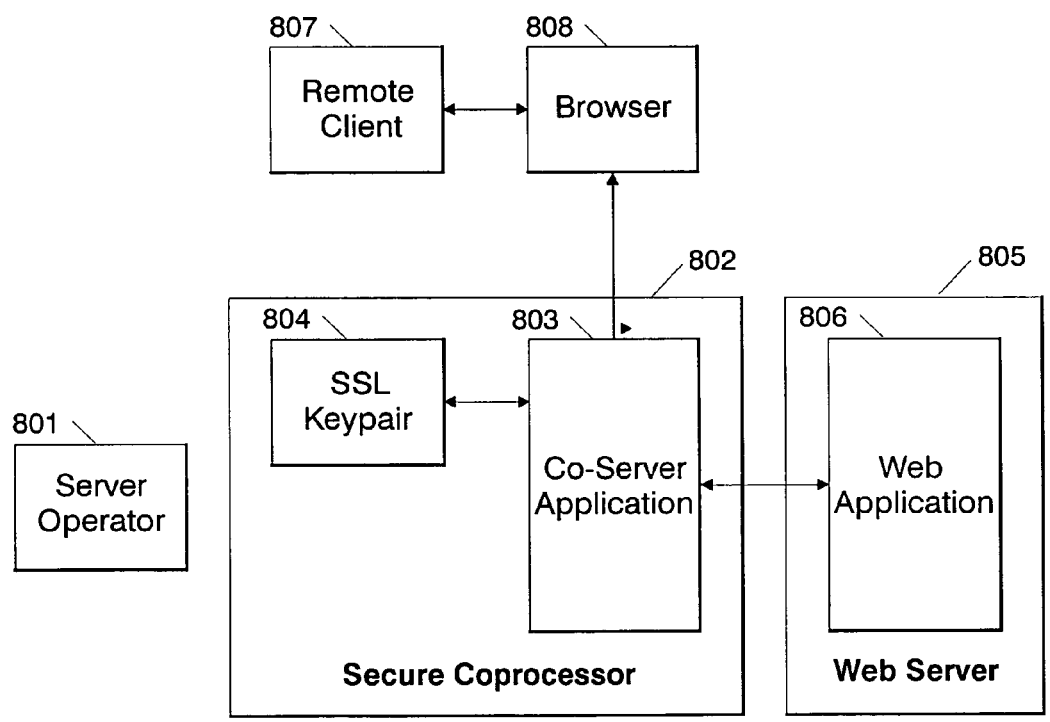
FIG. 8 shows an exemplary establishment of secure SSL session between client and trusted co-server.

FIG. 8 shows an exemplary establishment of secure SSL session between client and trusted co-server. A remote client (807) using a Web browser (808) initiates an SSL session with the co-server application (803) within the secure coprocessor (802) at the web site maintained by this server operator (801). Because client's web browser (808) indicates that the co-server application (803) suitably demonstrates knowledge of the private key matching the public key in this application's SSL-certified keypair (804), the client (807) can reasonably conclude that server-client communications within this SSL session originated within the trusted co-server (802, 803) and that client-server communications terminate in the trusted co-server (902,803)—even if the server operator (801) may be motivated to maliciously alter or spy on these communications.

FIGS. 9 through 13 show some various ways in which a web application can use a trusted co-server to enhance security and privacy.

Figure 9:
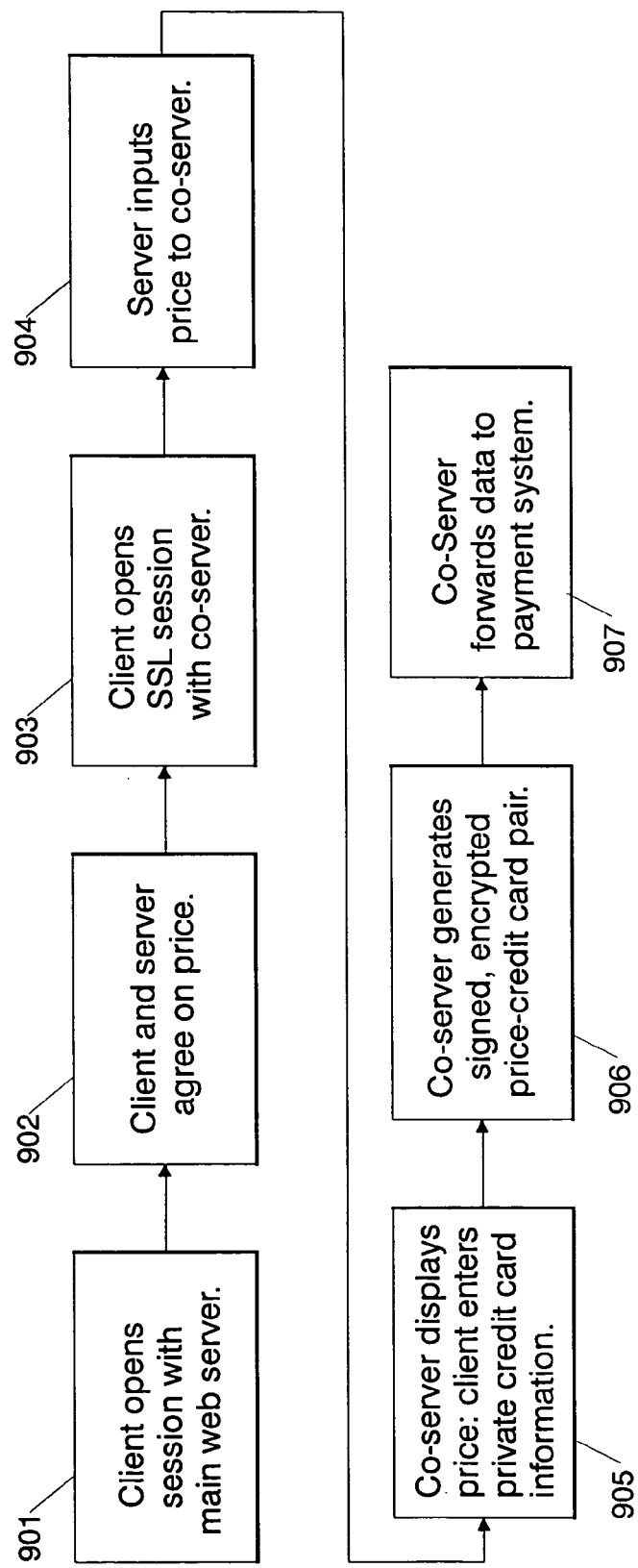
FIGS. 9–13 show some various ways in which a Web application can use a trusted co-server to enhance security and privacy.

FIG. 9 shows how a client can engage in a session with an insecure server (901), agree on a price for a product (902), then open an SSL session (903) to a trusted co-server, configured with a payment application. The server forwards the price to the co-server (904), which displays this and accepts the client's private credit card information (905) and signs and encrypts the pair (with a serial number, to prevent replay) (906). The server operator can then inject this signed encrypted packet into the payment system (907.)

This application ensures:

i) that client's private information remains private even from the server operator, and ii) the client's credit card is only charged once, and for the agreed-on amount, even if the server operator (or a hacker who has compromised the server) attempts to cheat.

Figure 10:
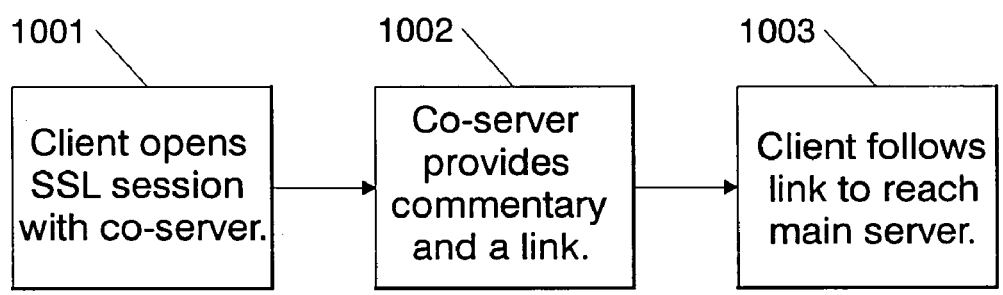

FIG. 10 shows how a client can open his interaction by establishing an SSL session (1001) with a trusted co-server configured with a server status application. The co-server displays some authenticated information to the client (1002) (such as: the security status and appropriate logos or seals of approval) about the server, and provides a link by which the user can click to proceed to the server (1003). (Following this link terminates the SSL session.) This ensures that the client gets accurate information about the server—even if the server operator might be motivated to falsify this information. For additional security, the co-server could assist in establishing a new SSL session for the client when interacting directly with the server.

Figure 11:
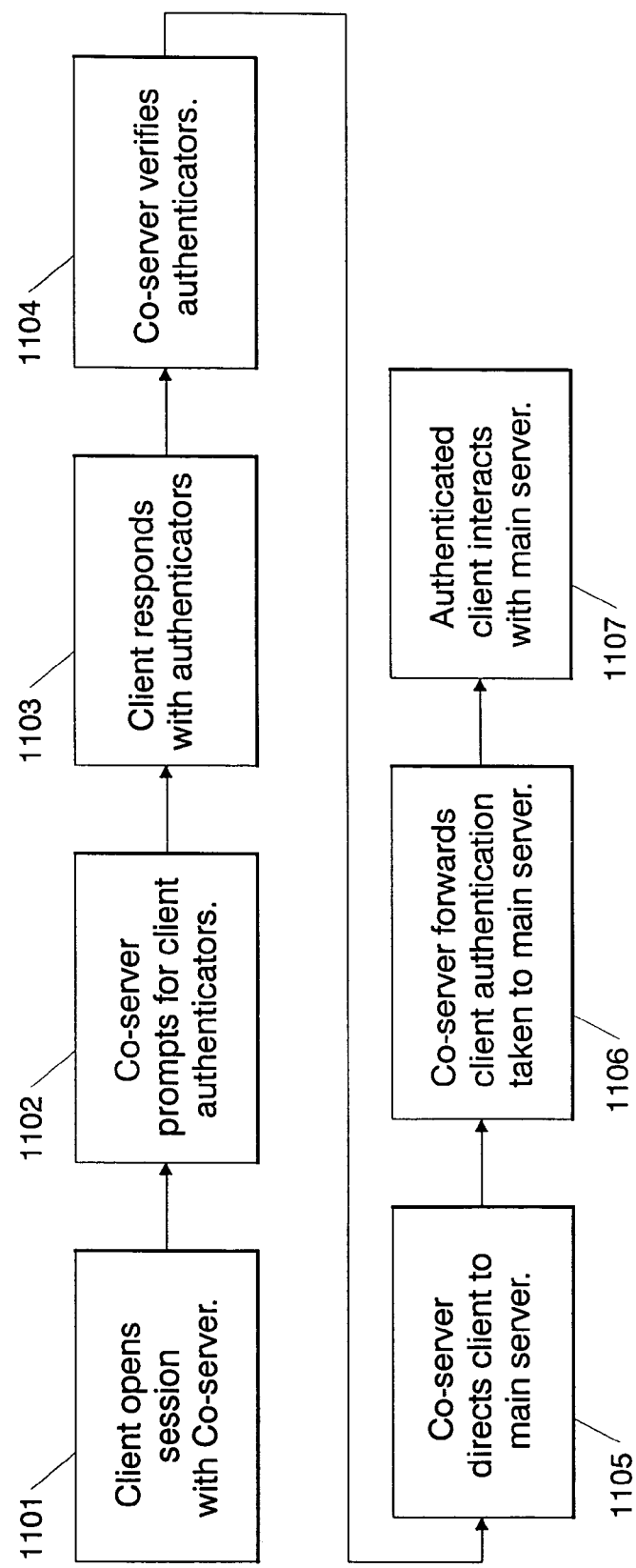

FIG. 11 shows how a client can open his interaction by establishing an SSL session with a trusted co-server (1101) configured with an authentication application. The co-server prompts the client (1102) for client authentication information, such as a user id and password. The client responds (1103), and the co-server verifies this information (1104), and then directs the client to the main web server (1105) but also provides this server with an authentication token indicating that the client has properly authenticated (1106). The SSL session then ends, and the client then interacts with the main server (which requires such a token to function) (1107). This protects the security of a restricted application, while also protecting the privacy of the client's authenticators from a malicious server operator or a compromised web server.

Figure 12:
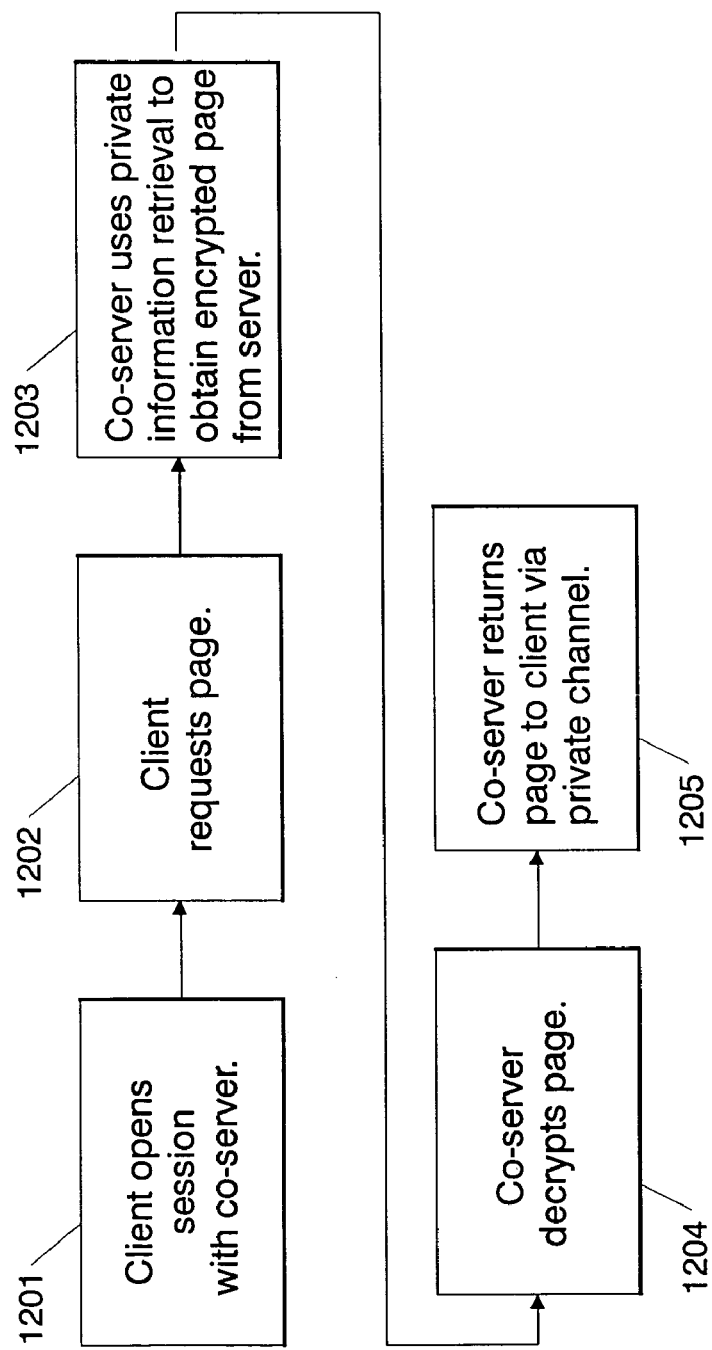

FIG. 12 shows how a client can open an SSL session (1201) with a trusted co-server configured with a private information retrieval application. The client requests (1202) a particular page of private data; the co-server then uses private information retrieval techniques (1203) to obtain this page from the set of pages stored on the main server, in such a way that the server operator learns no information about which page was requested.

The co-server then decrypts this page (1204), and returns the plaintext to the user through the encrypted SSL channel (1205). This ensures that the client can obtain information such as potentially embarrassing medical data without revealing the data to a malicious server operator or compromised server. This would also ensure that a server operator could not be forced to reveal which data which clients are examining.

Figure 13:
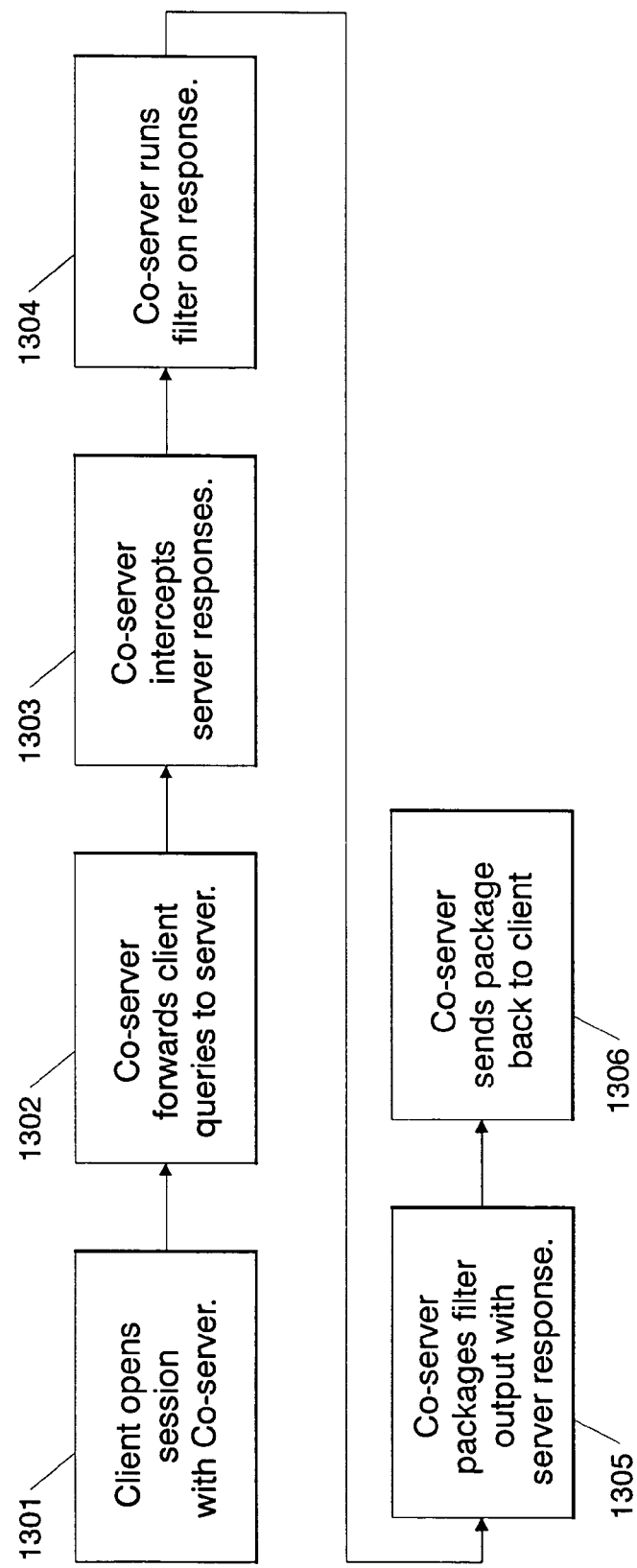

FIG. 13 shows how a client can open an SSL session (1301) with a trusted co-server configured with a filter application. (Such a filter might be a virus-scanner, for example.) The co-server (at the request of the client) then forwards client queries to the web server (1302). The co-server intercepts the server response (1303), runs the filter on them (1304), and packages the two into a page such that the co-server's response is in one well-defined portion of the page, and the server's response is confined to the other (1305). The co-server then sends this package back to the client via the SSL channel (1306). This ensures that the client can interact with the server—but gets authenticated filter output on each page from the co-server, even if the server operator might be motivated to falsify this output.

This invention can address each of the example problems discussed above: by enhancing a service to provide one or more desirable levels of security and/or privacy properties. This includes properties described herein and other properties known to those skilled in the art. A desirable level includes a level desired by a client, a service, a third party (e.g. a bank, a library, a data provider, a web site, a seller, a trusted authority, an operator, a manager, etc.) and any combination of these. Thus in an example embodiment the present invention provides methods and apparatus for a service to provide a client with a desired security level. This is advantageous particularly in applications missing security and/or privacy properties. As used herein the term security uses a broad definition to include, but not be limited to, correctness, non-disruption, overcoming and/or reacting to real and/or potential adversarial actions, maintaining all facets of privacy, etc.

Authentication of Clients

The program at the co-server can trap the password, authenticate the client, then issue a signed receipt that that client properly authenticated for that session.

Nonrepudiation of Client Activity

Besides issuing a receipt for client identity, the program at the co-server can issue a signed receipt for the entire transaction.

Nonrepudiation of Server Activity

The co-server can issue a receipt for the entire transaction, including the prompts the server provided, which generated the answers the client provided.

Credit Card Transaction Security

The program at the co-server can trap the credit card and transaction information, and inject it directly into the acquirer's system. The credit card number data never appears in plaintext at the server site; the server operator or a penetrator has no opportunity to inflate the transaction amount; and (unlike SET) the client need not change the way they operate. (This co-server application could be included as part of an entry-level e-merchant start-up package.)

Taxes on E-Commerce Activity

The program at the co-server can monitor the total tax owed by that merchant for the transactions that went through that co-server (e.g., because of some other co-server application there), and report that authenticated total back to the governmental entity.

Re-Selling of Intellectual Property

The owner of the property could provide it in ciphertext to the server; the co-server would decrypt the particular items being used, and ensure that appropriate licensing/royalty/watermarking requirements were being enforced.

Privacy of Sensitive or Proprietary Web Activity

With the proper private information retrieval scheme on the back-end, the co-server can fetch and provide the content to the client, without the server operator being aware of the content being fetched.

Correctness of Web Activity

The computation critical to the appropriate correctness properties can be moved into the co-server—whose application program would need to advertise that it was performing these computations.

Enforcement of Logo/"Seal of Approval" Licenses

The logo information could be provided, when appropriate, by the trusted co-server; logos that did not appear on an authenticated co-server-to-client channel are not legitimate.

Safety of Downloadable Content

An application at the co-server could run the latest anti-virus software either dynamically, as the data was being downloaded, or off-line (but then cryptographically verifying that the data being downloaded had indeed been scanned earlier). Clients can trust that content downloaded via this SSL-authenticated channel from the trusted co-server has been scanned.

Authenticity of Downloadable Content

An application at the co-server can verify the signatures of the posted content. Clients can trust that content downloaded via this SSL-authenticated channel from the trusted co-server has been authenticated. (Indeed, the client only need download the identity of the poster, not his public key, signature, and appropriate certificates.)

Integrity of Server Machine

If the trusted co-server can witness that the appropriate computational security tool (such as a network security analyzer or secure booting technique) was applied to the host—perhaps because this tool was applied from the co-server itself, or from a companion trusted machine—then it can include this data in the SSL-authenticated communication channel from the co-server to the client.

It should be noted that the above-discussed examples are exemplary embodiments, built around technology currently available commercially. Those skilled in the art would be able to develop alternate embodiments—particularly as new secure co-processing technology becomes available, and as continued experimentation and prototyping suggests modifications and improvements.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method, comprised of enhancing a computational service to each client of a plurality of clients, by:
    moving a selected portion of a computation from a server into a trusted co-server executing inside a secure coprocessor;
    allowing each client to interact with the server and the co-server; and
    using the trusted co-server as a trusted third party to authenticate interactions between the client and the server; and
    wherein the moving step includes the steps of
    i) installing a device private/public key pair on the co-server, ii) installing co-server application software in the trusted co-server, said co-server application software having an ability to authenticate itself using said device key pair,
iii) the co-server application software then generating an application key pair including a public key and a private key,
iv) using the co-server application's ability to authenticate itself with said device key pair to prove to a certificate authority that said application key pair belongs to an installation of said co-server application,
v) the certificate authority then issuing a certificate attesting to the public key of said application key pair and the entity to which said public key belongs, and
vi) the co-server application storing said certificate,
the step of using the trusted co-server includes the steps of
i) establishing a session between the client and the co-server application, and
ii) indicating to the client that the co-server application demonstrates knowledge of the private key of said application key pair to provide assurance of the authenticity of communication from the trusted co-server.

2. A method as in claim 1, wherein the step of allowing includes providing a trusted third party at said server.

3. A method as recited in claim 1, wherein said step of allowing includes enabling said each client an authenticated, private channel to said co-server.

4. A method as in claim 3, wherein said step of enabling includes the said each client using the co-server's certified application keypair to establish a shared symmetric key.

5. A method as in claim 4, wherein said step of enabling includes employing the Secure Sockets Layer (SSL) protocol.

6. A method as in claim 1, wherein said service is a Web service and said clients are remote users operating browsers.

7. A method as in claim 1, wherein said step of moving includes integrating functions of said co-server in a same machine as said server.

8. A method as in claim 1, wherein said enhancing includes providing a desired security and/or privacy property.

9. A method as in claim 1, wherein said enhancing includes providing at least one security and/or privacy property to an application selected from the group including: authentication of clients, nonrepudiation of client activity, nonrepudiation of server activity, credit card transaction security, taxes on e-commerce activity, re-selling of intellectual property, privacy of sensitive or proprietary web activity, correctness of web activity, enforcement of logo and/or "seal of approval" licenses, safety of downloadable content, authenticity of downloadable content, integrity of server machine, and any combination of these.

10. A method as in claim 1, wherein:
input from said client is prompt from server for the user's private authentication data, input from said server is this authentication data, and a co-server algorithm that generates output to a client based on said current co-server state and said inputs indicates whether or not the authentication data is correct for this user.

11. A method as in claim 10, where the co-server algorithm that generates output to said client based on a current co-server state and inputs includes a signed statement, using a private key known to the co-server, attesting, for the server, that the client engaged in an interaction satisfying certain properties.

12. A method as in claim 10, where the co-server algorithm that generates output to said client based on a current co-server state and inputs includes a signed statement, using a privacy key known to the co-server, attesting, for the client, that the server engaged in an interaction satisfying certain properties.

13. A method as in claim 10, wherein:
the input from said client includes a credit card number (CCN), the output co-server algorithm that generates output to said client based on a current co-server state and inputs includes the CCN, encrypted so that the server cannot read the CCN but an acquirer can.

14. A method as in claim 13, wherein:
the input from said server includes a transaction amount, the output co-server algorithm that generates output to said client based on a current co-server state and inputs includes the transaction amount, cryptographically bound to the encrypted CCN so that the server cannot alter the transaction amount.

15. A method as in claim 10, where:
the input from said client includes a credit card number (CCN), the input from said server includes a transaction amount, the co-server encrypts this CCN so that the server cannot read the CCN but an acquirer can, and cryptographically binds the transaction amount to this encrypted CCN, then, at some point during or after the interaction, transmits this data to the acquirer in such a manner so that the acquirer can receive this transaction exactly once.

16. A method as in claim 10, where:
a remote party is an owner of intellectual property, the input from the server includes part of this property, encrypted so that only the co-server can decrypt said part, the co-server algorithm that generates output to said client based on a current co-server state and inputs include a portion of a decryption of input from said client.

17. A method as in claim 10, where the co-server algorithm that generates output to said client based on said current co-server state and said inputs includes a transformation of a portion of a decryption of input from said server, where said transformation includes adding a watermark.

18. A method as in claim 10, where the co-server algorithm includes a transformation of a portion of a decryption of input from said server, where said transformation includes reducing the quality of the plaintext.

19. A method as in claim 10, where the co-server algorithm includes a portion of a decryption of input from said server, re-encrypted in a manner that a secure coprocessor at the client site can decrypt said server.

20. A method as in claim 1, wherein:
the interactions include a transaction amount A, co-server input includes an accumulated total, a function co-server algorithm that generates a new co-server state based on a current co-server state and inputs updates the accumulated total by adding T(A), where T is a predefined function, and at some point during or after this interaction, the co-server produces an authenticated statement of the current value of the accumulated total.

21. A method as in claim 1, wherein:
the establishing step includes the step of the client providing input including a choice of which record R in a set of records the client would like to receive, the co-server includes this record R in its response to the client, however, the co-server obtains R in such a way as the server does not know which record was the one selected.

22. A method as in claim 1, wherein:
a remote party establishes a content evaluation scheme, consisting of an evaluation function mapping content to some set of indicators, and as part of computing the client output co-server algorithm, the co-server calculates, or verifies an external calculation, of the evaluation function and includes the result in the client output.

23. A method as in claim 22, where the evaluation function is parameterized by a "signature file" and where the output to the client includes an identification of which signature file was used in this interaction.

24. A method as in claim 22, where the remote party has injected the evaluation function and/or some of its parameters into the co-server through a private channel, so that the server cannot know the details of the evaluation function execution occurring on the co-server.

25. A method as in claim 22, where input from the server includes both content and a signature on the content, and the evaluation function includes testing whether the signature is valid.

26. A method as in claim 1, where:
a remote party establishes a content evaluation scheme, consisting of an evaluation mapping content to some set of indicators, and as part of computing the server output co-server algorithm, the co-server calculates, or verifies an external calculation, of the evaluation function and includes the result in the output.

27. A method as in claim 1, where:
the co-server has the ability to carry out security-enhancing actions against the server, and output returned to the client indicates which of these actions have been carried out, and how recently.

28. A method as in claim 1, where:
the client can specify whether the interaction is a read interaction or a write interaction;
for a write interaction:
the client input includes a message M and a specification S of the appropriate entities who can read this message;
the co-server retains M and S by storing them in some combination across the co-server and server via an algorithm that generates new co-server state based on said current co-server state and said inputs, the internal state in the co-server and co-server algorithm that generates output to said server based on a current co-server state and inputs;
in said write interaction:
any portion of M sent via co-server algorithm that generates output to said server based on said current co-server state and said inputs is encrypted, so that the server cannot access the plaintext;
and mechanisms are used to ensure that, when the co-server later retrieves any of this data from the server, that the data has not been changed;
for a read interaction:
the client input specifies which message M the client would like to read, the co-server retrieves S; if the client satisfies S, then the co-server sends M back to the client, after first retrieving and decrypting M.

29. A method according to claim 1, wherein:
the moving step includes the step of an operator of the server using a secure coprocessor platform to install and certify the trusted co-server, including the steps of
i) the server operator obtaining a secure coprocessor platform,
ii) the server operator installing the co-server application software into the secure coprocessor platform,
the establishing step includes the steps of
i) establishing an SSL session between the client and the trusted co-server, and
ii) the client using a Web browser to initiate an SSL session with the co-server application within the secure co-processor at a Web site maintained by the server operators, and
the indicating step includes the step of said Web browser indicating to the client that the co-server application demonstrates knowledge of the private key of said generated application key pair.

30. A method according to claim 29, wherein the using step includes the further steps of:
the client opening an SSL session to the trusted co-server, said trusted co-server being configured with a payment application, including the steps of
i) the server forwarding a price to the co-server,
ii) the co-server then displaying said price and accepting private credit card information of the client,
iii) the co-server signing and encrypting said price and said private credit card information, and
iv) the server operator then injecting said encrypted price and credit card information into a payment system;
the client opening an SSL session with a trusted co-server configured with a server status application, including the step of the co-server displaying authenticated information to the client about the server and providing a link by which the client can connect to the server; and
the client opening an SSL session with the trusted co-server, said trusted co-server being configured with an authentication application, including the steps of
i) the co-server prompting the client for client authentication information, including a user id and password,
ii) the client providing said authentication information,
iii) the co-server verifying the authenticity of said information, then directing the client to the server, and providing the server with an authentication token indicating that the client has properly authenticated.

31. A method for enhancing a service to provide security and/or privacy to each client of a plurality of clients, said service including computation on a server controlled by an operator, the method comprising:
moving a selected portion of said computation from a server controlled by said operator into a trusted co-server executing inside a secure coprocessor;
allowing clients to interact with the server through the co-server; and
using the trusted co-server as a trusted third party to authenticate interactions between the client and the server; and
wherein the moving step includes the steps of
i) installing a device private/public key pair on the co-server,
ii) installing co-server application software in the trusted co-server, said co-server application software having an ability to authenticate itself with said device key pair,
iii) the co-server application software then generating an application key pair including a public key and a private key,
iv) using the co-server application's ability to authenticate itself with said device key pair to prove to a certificate authority that said application key pair belongs to an installation of said co-server application, v) the certificate authority then issuing a certificate attesting to the public key of said application key pair and the entity to which said public key belongs, and vi) the co-server application storing said certificate, the step of using the trusted co-server includes the steps of i) establishing a session between the client and the co-server application, and ii) indicating to the client that the co-server application demonstrates knowledge of the private key of said application key pair to provide assurance of the authenticity of communication from the trusted co-server.

32. A method as recited in claim 31 wherein the secure coprocessor is installed at the server.

33. A method for enhancing a service including computation on a server controlled by an operator, the method comprising:

providing at least one security and privacy property to at least one client of a plurality of clients by:

moving a selected portion of said computation from a server controlled by said operator into a trusted co-server executing inside a secure coprocessor;

enabling clients to interact with the server and the co-server; and using the trusted co-server as a trusted third party to authenticate interactions between the client and the server; and wherein the moving step includes the steps of i) installing a device private/public key pair on the co-server, ii) installing co-server application software in the trusted co-server, said co-server application software having an ability to authenticate itself using said device key pair, iii) the co-server application software then generating an application key pair including a public key and a private key, iv) using the co-server application's ability to authenticate itself with said device key pair to prove to a certificate authority that said application key pair belongs to an installation of said co-server application, v) the certificate authority then issuing a certificate attesting to the public key of said application key pair and the entity to which said public key belongs, and vi) the co-server application storing said certificate, the step of using the trusted co-server includes the steps of i) establishing a session between the client and the co-server application, and ii) indicating to the client that the co-server application demonstrates knowledge of the private key of said application key pair to provide assurance of the authenticity of communication from the trusted co-server.

34. A trusted co-server, executing a program such that:

for multiple parties, including a Web server, a remote client and said co-server, each party provides input, and then the co-server carries out for each party, a function on all these inputs, and output to said each party; and wherein the co-server executes so as to authenticate interactions between the client and the Web server so that said parties can authenticate and trust the correct execution of the co-server, in interactions between the client and the co-server, despite attempts by the Web server to subvert said execution; and wherein a device private/public key pair and co-server application software is installed in the trusted co-server, said co-server application software having an ability to authenticate itself using said device key pair, and said co-server application software generates an application key pair including a public key and a private key, said co-server authenticates itself using said device key pair to prove to a certificate authority that said application key pair belongs to an installation of said co-server application, the certificate authority then issues a certificate attesting to the public key of said application key pair and the entity to which said public key pair belongs, and the co-server application stores said certificate, and when a session is established between the client and the co-server application, the client is informed that the co-server application has knowledge of the private key of said key pair to provide assurance of the authenticity of communications from the trusted co-server.

35. A trusted co-server according to claim 34, wherein the co-server executes inside a tamper respondent secure coprocessor.

36. A trusted co-server according to claim 34, wherein the secure coprocessor is co-located at said server.

37. A method of enhancing the security of a Web based transaction utilizing a server, the method comprising the steps:

providing the server with a trusted co-server; and using the trusted co-server to execute a program such that:

for multiple parties, each party provides input and then said co-server carries out for each party, a function on all these inputs to authenticate interactions between the party and the server and the parties trust interactions between the parties and the servers and wherein a device private/public key pair and co-server application software is installed in the trusted co-server, said co-server application software having an ability to authenticate itself using said device key pair, and said co-server application software generates a key pair including a public key and a private key, said co-server authenticates itself using said device key pair to prove to a certificate authority that said application key pair belongs to an installation of said co-server application, the certificate authority then issues a certificate attesting to the public key of said application key pair and the entity to which said public key pair belongs, and the co-server application stores said certificate, and when a session is established between the client and the co-server application, the client is informed that the co-server application has knowledge of the private key of said key pair to provide assurance of the authenticity of communications from the trusted co-server.

38. A method according to claim 37, where:

one party is a Web server and another party is a remote client.

39. A method according to claim 37, where:

the client authenticates the co-server, the client sends its input to the co-server over a private channel, and the co-server sends its output to said another party over a private channel.

40. A program storage device readable by machine, tangibly embodying a program of instructions executable by the machine to perform method steps for enhancing a computational service to at least one client of a plurality of clients, said method steps comprising:

moving a selected portion of a computation from a server into a trusted co-server executing inside a secure coprocessor;

allowing each client to interact with the server and the co-server; and using the trusted co-server as a trusted third party to authenticate interactions between the client and the server; and wherein the moving step includes the steps of:

i) installing a device private/public key pair on the co-server, ii) installing co-server application software in the trusted co-server, said co-server application software having an ability to authenticate itself using said device key pair, iii) the co-server application software then generating an application key pair including a public key and a private key, iv) using the co-server application's ability to authenticate itself with said device key pair to prove to a certificate authority that said application key pair belongs to an installation of said co-server application, v) the certificate authority then issuing a certificate attesting to the public key of said application key pair and the entity to which said public key belongs, and vi) the co-server application storing said certificate, the step of using the trusted co-server includes the steps of i) establishing a session between the client and the co-server application, and ii) indicating to the client that the co-server application demonstrates knowledge of the private key of said application key pair to provide assurance of the authenticity of communication from the trusted co-server.

41. A program storage device according to claim 40, wherein the step of allowing includes providing a trusted third party at said server.

42. A program storage device according to claim 41, wherein the step of allowing includes enabling said each client an authenticated, private channel to said co-server.

* * * * *